United States Patent
DeSanti

(10) Patent No.: US 6,901,733 B2
(45) Date of Patent: Jun. 7, 2005

(54) DEBRIS GATHERING AND PICKUP TOOL

(76) Inventor: Fred H. DeSanti, 41 Oakcrest Dr., Huntington Station, NY (US) 11746

( * ) Notice: Subject to any disclaimer, the term of this patent is extended or adjusted under 35 U.S.C. 154(b) by 0 days.

(21) Appl. No.: 10/849,744

(22) Filed: May 20, 2004

(65) Prior Publication Data

US 2004/0250524 A1 Dec. 16, 2004

Related U.S. Application Data

(60) Provisional application No. 60/478,758, filed on Jun. 16, 2003.

(51) Int. Cl.[7] ............................................... A01D 7/00
(52) U.S. Cl. ................................................. 56/400.12
(58) Field of Search ........................ 56/400.12, 400.04, 56/400.06, 400.07, 400.11, 400.19; 15/111

(56) References Cited

U.S. PATENT DOCUMENTS

| | | |
|---|---|---|
| 1,160,282 A | 11/1915 | Harris et al. |
| 3,105,348 A | 10/1963 | Vosbikian et al. |
| 3,601,966 A | 8/1971 | Kerry |
| 4,292,794 A | 10/1981 | Gascon |
| 4,378,671 A | 4/1983 | Gascon |
| 5,069,026 A | 12/1991 | Johnson |
| 5,303,536 A * | 4/1994 | Tolliver .................... 56/400.12 |
| 6,134,869 A | 10/2000 | Barrett |
| 6,336,314 B1 | 1/2002 | Crevier |
| 6,502,381 B2 | 1/2003 | Crites |

* cited by examiner

Primary Examiner—Árpád Fábián Kovács
(74) Attorney, Agent, or Firm—Island Patent; F. Scott Tierno

(57) ABSTRACT

A debris gathering and pickup tool for use in gathering, grasping, lifting, and disposing of debris present upon a ground surface of a selected area. The gathering and pickup tool includes a gathering portion and a grasping portion. The gathering portion includes a flattened gathering head, an elongated handle, and a coupling arrangement for coupling the gathering head to the elongated handle at a pre-selected downward angle. Similarly, the grasping portion may include a flattened grasping member, a user operated grasping sleeve, and a second coupling arrangement establishing a downward angle between the grasping member and the grasping sleeve. The gathering portion is further structured for being slidably coupled to the gathering portion, such that the user may selectively move the grasping portion between a retracted position and a grasping position, as needed for cleanup activities.

7 Claims, 8 Drawing Sheets

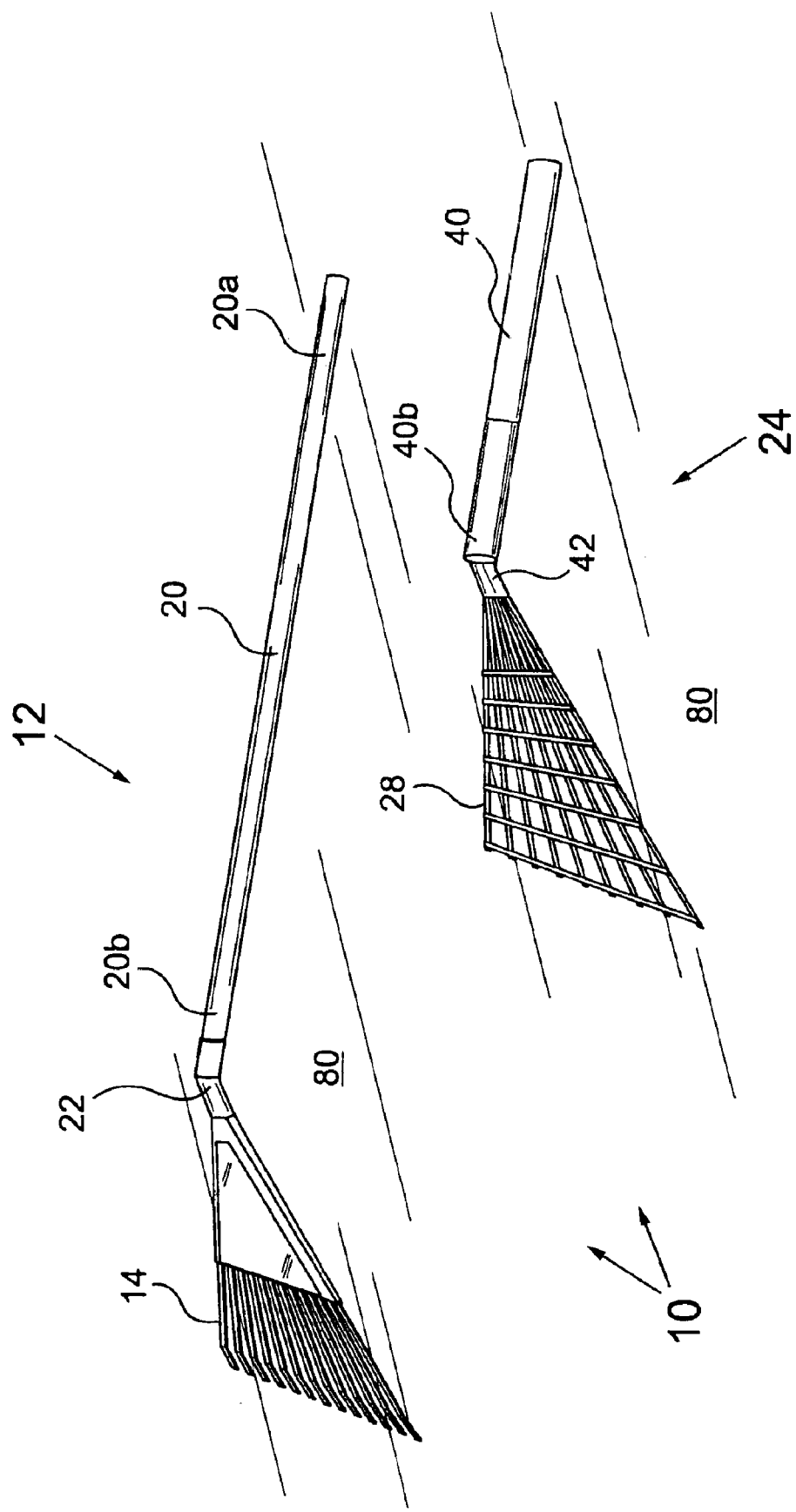

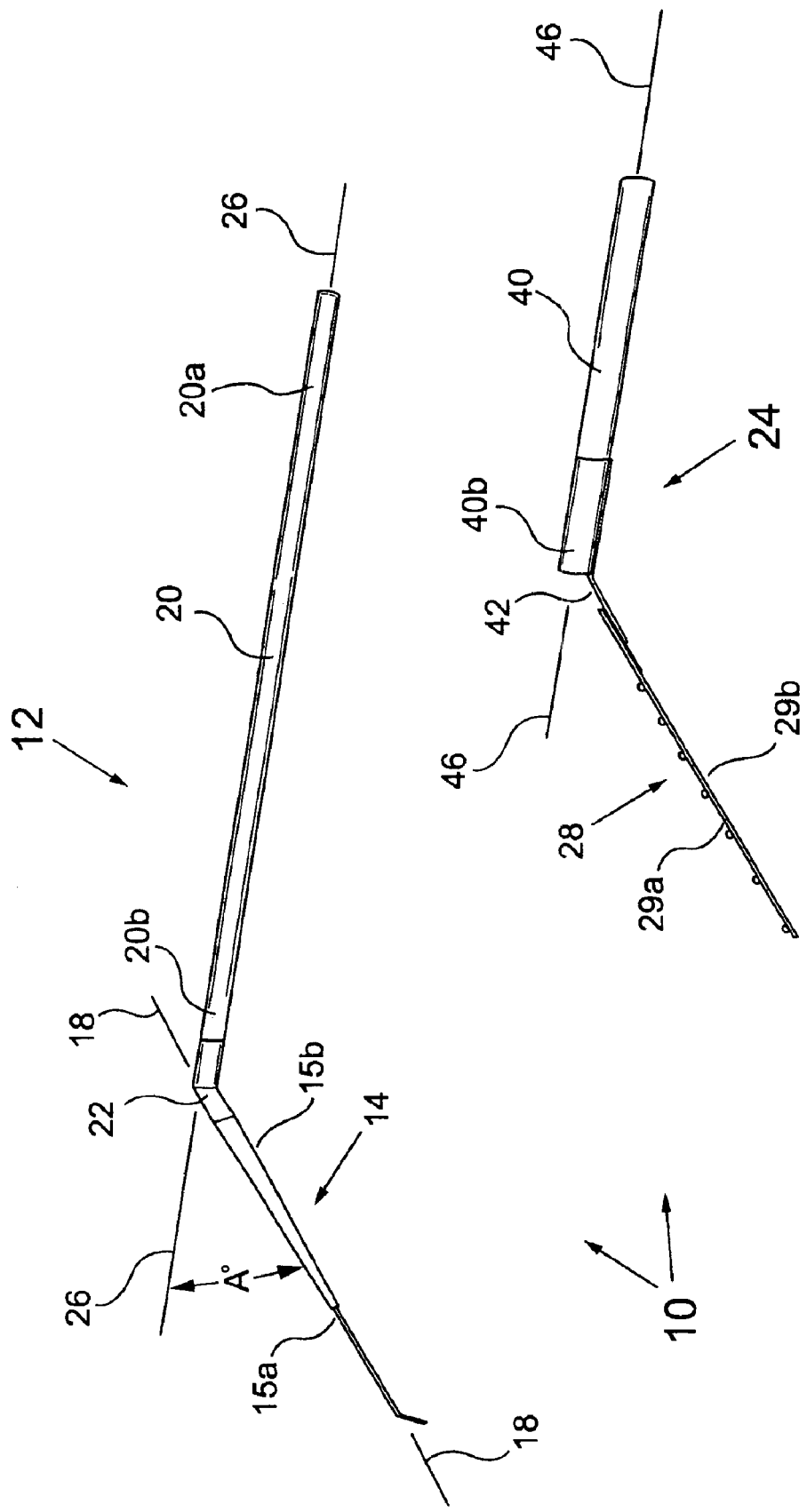

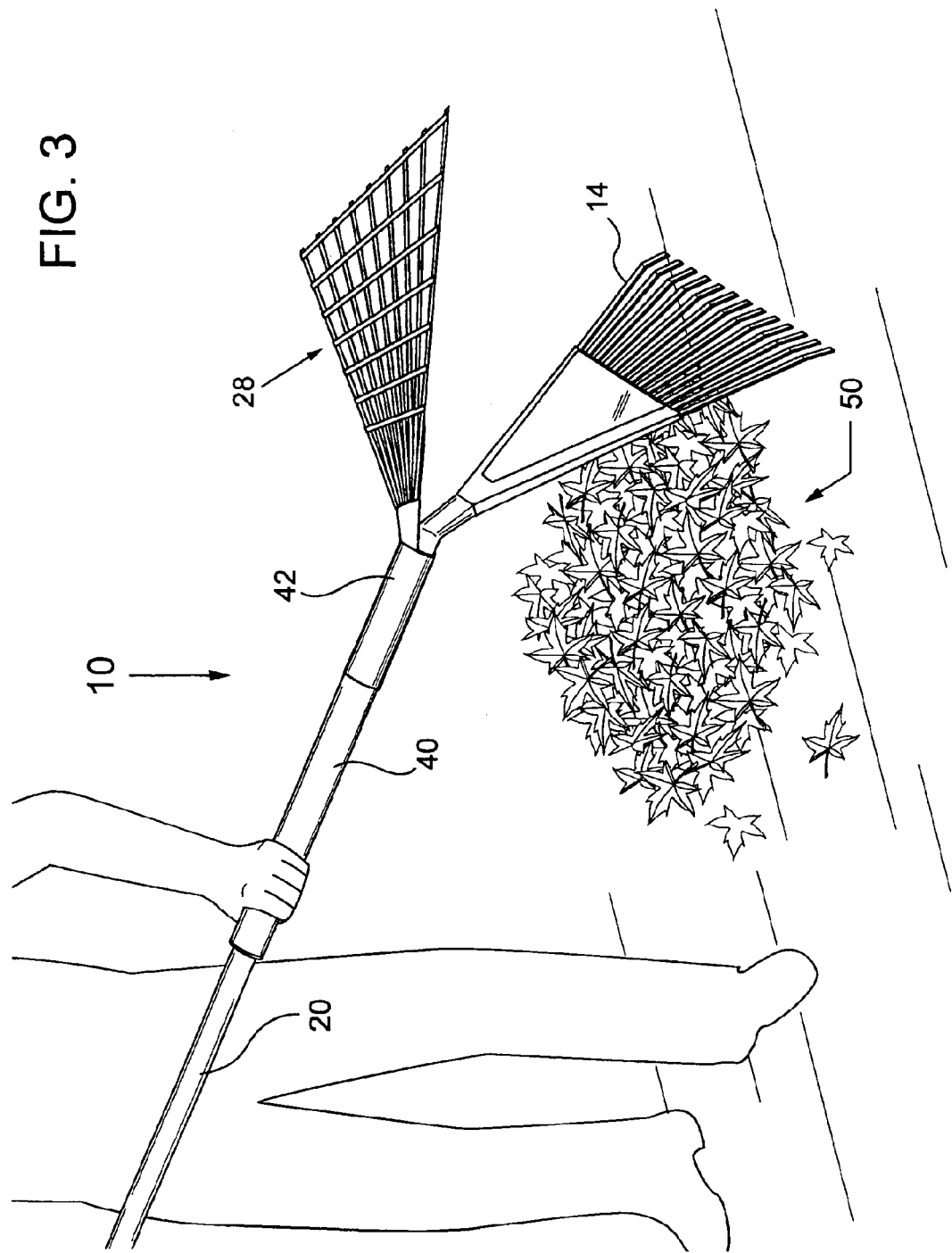

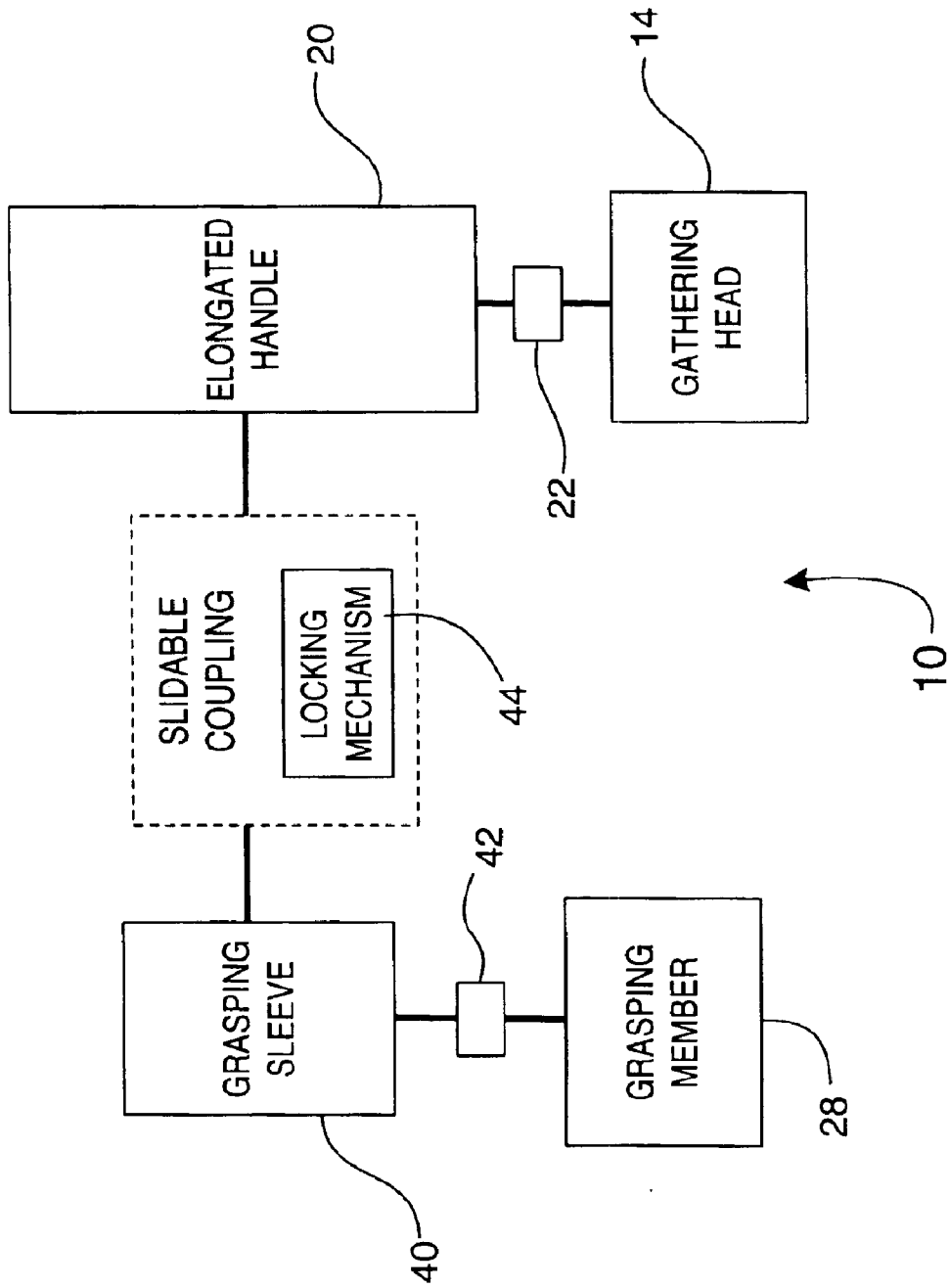

DEBRIS GATHERING AND PICKUP TOOL

CROSS REFERENCE TO RELATED APPLICATION

The subject matter contained herein is related to provisional patent application Ser. No. 60/478,758 filed on Jun. 16, 2003, which is hereby incorporated by reference.

TECHNICAL FIELD

The present invention relates most generally to cleanup devices. More particularly, the invention relates to a gathering and pickup tool, including a gathering portion and a grasping portion. The gathering and pickup tool is employable for gathering debris into one or more bunches, and subsequently grasping and picking up the debris to, for example, place the debris in a nearby cleanup container.

BACKGROUND

Very often a cleanup task involves a need to gather debris into piles or bunches, which are subsequently picked up and disposed of. For example, when a homeowner needs to cleanup a yard during the Fall season, there is a need to gather items such as leaves, twigs, clippings, etc., into piles or bunches. Once formed, a bunch must subsequently be lifted and deposed of—typically using a container or by being bagged.

Importantly, when using a conventional rake or broom during cleanup activities, the step of lifting bunches of gathered debris and placing them within a suitable container, involves the use of a second item or a hand/arm of the user. For example, when gathering leaves that have accumulated in a yard, an individual will often gather the leaves into bunches, and then while bending over, may grasp the leaves by sandwiching them between a rear facing surface of the rake head and the user's hand/arm. Such a process, as well as others providable by a skilled person, is slow, tedious, and can be quite arduous.

Accordingly, it would be most desirable to have a yard cleanup device, which may be termed a debris gathering and pickup tool, that enables a user to both gather debris present within an area of interest into bunches, and further readily enable a user to lift the bunches into a disposal container—without having to bend over. A number of other characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF THE INVENTION

In accordance with the present invention, a debris gathering and pickup tool is structured for gathering debris contained within a selected area and lifting the debris into an available cleanup container. The gathering and pickup tool preferably includes a gathering portion and a grasping portion. The gathering portion includes a flattened gathering head, an elongated handle, and a coupling arrangement structured for coupling the gathering head to the elongated handle at a pre-selected downward angle. The downward angle, as illustrated in the figures, may be measured between a preferably flattened or substantially flattened plane of the gathering head and a longitudinal axis of the elongated handle. The grasping portion includes a flattened or substantially flattened grasping member, that is fixed to a user operated grasping sleeve by a second coupling arrangement. As with the gathering portion, a downward angle is established between the grasping member and a longitudinal axis the grasping sleeve. In various embodiments of the invention, the downward angle of the gathering head and the downward angle of the grasping member may be substantially equivalent, and within a wide range of degrees, as determined by the respective embodiment and the task that embodiment is intended to be used for. When considering a most preferred embodiment of the invention, as will be discussed in great detail hereinafter, the downward angle of the gathering head and the downward angle of the grasping member may be substantially within a range of 15 to 60 degrees. Such an angle is well suited to a rake head gathering member. In addition, it should be understood that it may be desirable to provide a somewhat lesser angle for the downward angle of the grasping member, with respect to the downward angle employed for the gathering head, again as a function of the task to be performed.

Importantly, the gathering portion and grasping portion are structured to be slidably coupled together so that the grasping portion may be selectively moved, by the user, between a first retracted position, wherein the gathering portion may be employed for gathering debris and forming one or more bunches, and a second grasping position wherein debris may be grasped between a second surface of the gathering head and a first surface of the grasping member. Accordingly, the grasping portion is slidably coupled to the gathering portion so that the user may selectively gather and grasp bunched debris by moving the grasping portion between the retracted position (e.g., a gathering position) and the grasping position (for grasping, lifting, and subsequently releasing/disposing of the grasped debris).

A most preferred embodiment of the invention provides for a slidable coupling of the gathering portion to the grasping portion by simply sliding the elongated handle into the grasping sleeve of the grasping portion. As such, the preferred diameter of the elongated handle would be slightly smaller than the internal grasping sleeve diameter. When slidably coupled, the elongated handle passes coaxially through a center of the grasping sleeve, so that a longitudinal axis of the grasping sleeve is substantially in line with the longitudinal axis of the elongated handle.

The debris gathering and pickup tool of the invention may further include a locking/holding mechanism, which may be employed by the user to maintain the grasping sleeve at the retracted position, such that the grasping sleeve, while slidably coupled to the elongated handle, will not slide or otherwise substantially move until the locking/holding mechanism is released. Skilled individuals will appreciate the varied arrangements that may be employed for embodying such a user' operated locking/holding mechanism. In addition, a most preferred locking/holding mechanism may be provided such that the grasping sleeve may be positioned at any user selected position, along the elongated handle, that is inclusively between the retracted position and the grasping position (possibly with the grasping member in an inverted position).

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 1A is an elevated perspective view of a preferred embodiment of a gathering and pickup tool in accordance with the invention, which is shown in an uncoupled or separated state.

FIG. 1B shows the embodiment depicted in FIG. 1A in a side view, clearly showing the downward angling of each of the gathering head and the grasping member, with respect to a longitudinal axis of the elongated handle and the grasping sleeve, respectively.

FIG. 3 provides yet another depiction of the embodiment of FIGS. 1 and 2 with the gathering portion in an inverted and preferably locked position, enabling the user to readily gather debris into one or more large bunches, even when using the tool in and around sloped, stepped or walled locations.

FIG. 7 provides a high level conceptual block diagram depicting an exemplary preferred embodiment of the present invention including a locking mechanism.

PARTIAL LIST OF REFERENCE NUMERALS

Figure 2:
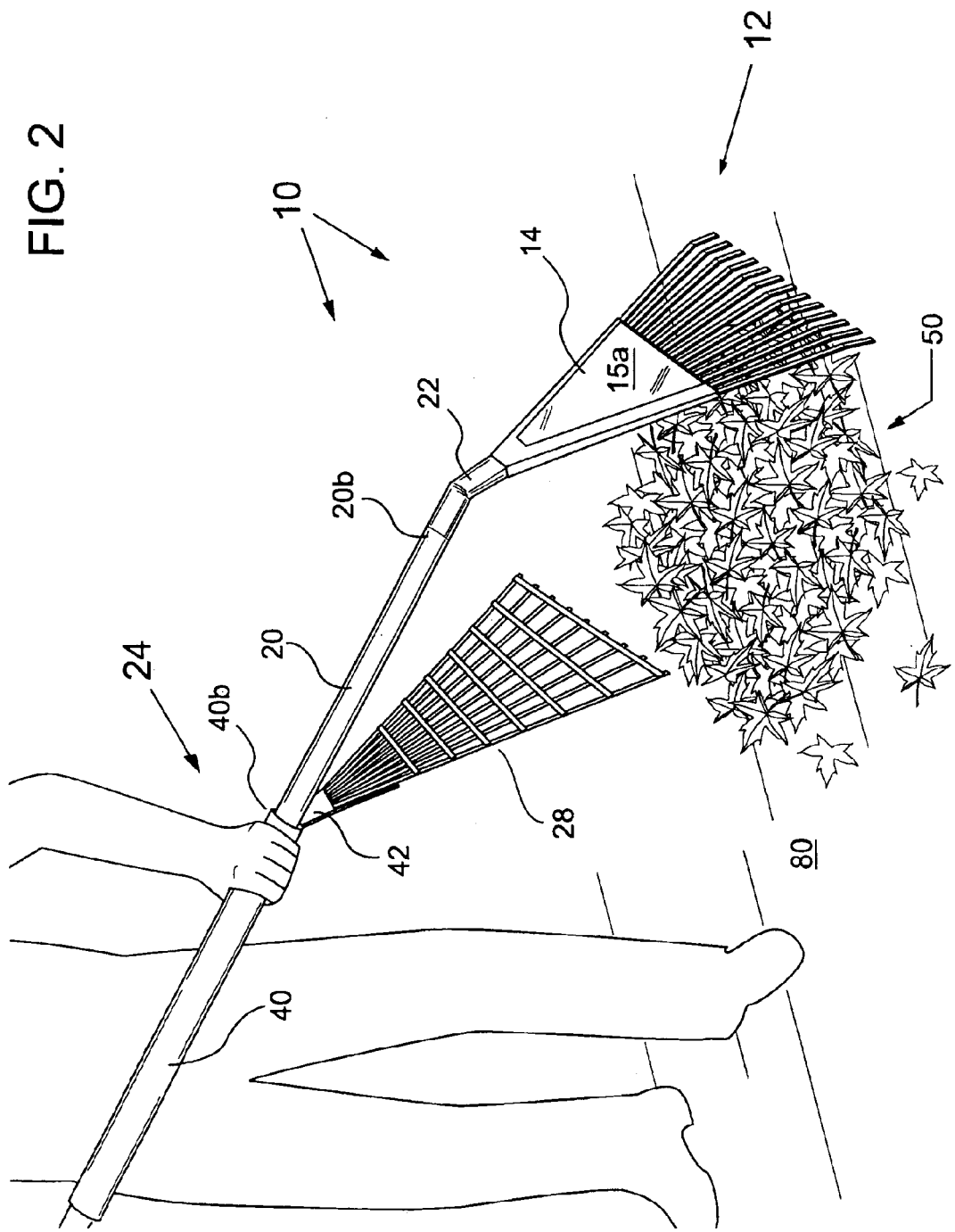
FIG. 2 depicts a gathering portion and a grasping portion of the invention in a coupled, retracted state, and being used by a user for gathering debris so as to form one or more bunches of debris.

10—gathering and pickup tool
12—gathering portion
14—gathering head (generic)
14a—gathering rake head
14aa—rake fingers
14b—gathering broom head
14bb—broom bristles
15a—first (front) surface or side of 14
15b—second (back) surface or side of 14
18—plane of 14
20—elongated handle
20a—proximate end of 20
20b—distal end of 20
22—(gathering portion) coupling
24—grasping portion
26—longitudinal axis of 20
28—(flattened) grasping member
29a—first (front) surface or side of 28
29b—second (back) surface or side of 28
40—grasping sleeve
40b—lower or distal end of 40
42—(grasping portion) coupling
44—locking mechanism
46—longitudinal axis of 40
50—bunch or bunch of debris
80—ground surface

DETAILED DESCRIPTION OF EMBODIMENTS OF THE INVENTION

It is important to establish the definition of a number of descriptive terms and expressions that will be used throughout this disclosure. The term 'debris' which is to be broadly defined, may include a large variety of items ranging from organic items such as leaves, twigs, clippings, etc., to somewhat small sized construction debris. Essentially any debris items that need to be removed or disposed of, which are gatherable and graspable with an embodiment of the present invention, are to be considered within the scope of the invention. The expression 'ground surface' may be assumed to include any of a grassy ground surface, a dirt or stone covered area, or a concrete or paved surface. In addition, the surface from which debris are to be removed may not be flat and horizontal, and may certainly include inclined and stepped areas. The term 'flattened' as applied to the preferred embodiments of the gathering head and or the grasping portion of the invention, may be assumed to indicate a substantially planar structure, but one that may have some thickness, curvature, and other structural features associated therewith. It may be noted that the terms 'lower' and 'upper' may be applied to the present invention and descriptions thereof, with reference to the orientation of the views and depictions of the included figures, unless otherwise indicated by the context in which the terms are employed. As such, when viewing a figure, a lower item (or portion of an item) will generally be relatively closer to the bottom of the drawing sheet than the top, while an upper item, or portion of an item, will generally be relatively closer to the top of the drawing sheet than the bottom. Other important terms and definitions will be provided, as they are needed, to properly define the present invention and its associated novel characteristics and features.

Referring now to the drawings, FIG. 1A depicts an elevated perspective view of a first preferred embodiment of the invention placed upon a ground surface 80. Illustrated therein is a debris gathering and pickup tool 10 structured for use in gathering, grasping, and lifting debris 50 (as shown in FIGS. 2 and 3) for disposal. Preferred embodiments of the invention include a gathering portion 12, and a grasping portion 24. The gathering portion 12 is structured with a preferably substantially flattened gathering head 14, and an elongated handle 20. In a most preferred embodiment of the invention, the gathering head 14 is rigidly coupleable to the elongated handle 20 at a pre-selected downward angle 'A', as best seen in FIG. 1B. The angle A is defined as the angle between a plane 18 of the gathering head 14 and a longitudinal axis 26 of the elongated handle 20.

Importantly, embodiments of the invention may be provided with a downward angle of the gathering head 14 and the downward angle of the grasping member 28 that are substantially equivalent, and within a wide range of degrees. The actual downward angles employed for each of the gathering head 14 and the grasping member 28, of a respective embodiment, are best determined by the actual usage and task that must be performed with that embodiment. When considering a most preferred embodiment of the invention, the downward angle of the gathering head and the downward angle of the grasping member may be substantially within a range of 15 to 60 degrees. As appreciated by skilled persons, it may be desirable to provide a somewhat lesser angle for the downward angle of the grasping member, with respect to the downward angle of the gathering head, for certain embodiments.

In addition, for certain applications and uses, it may be desirable to provide angles that are substantially greater than 60 degrees. For example, it may be desirable to provide obtuse angles between the gathering head 14 and the elongated handle 20 of a gathering portion 12, say in the range of 100 to 140 degrees (not illustrated). These latter embodiments would preferably employ obtuse angles for both the gathering portion 12 and the grasping portion 24.

Figure 6A:
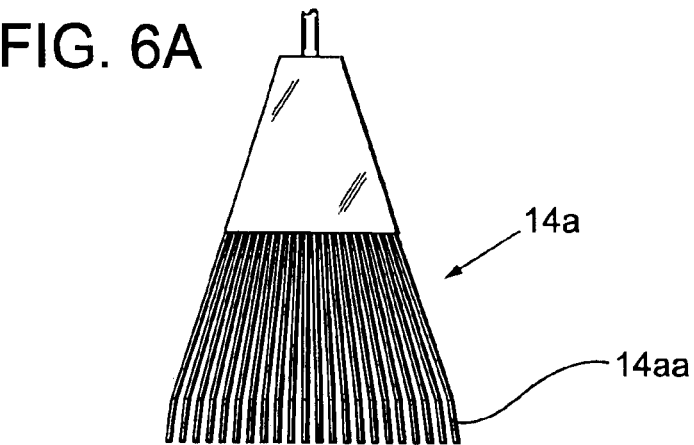
FIGS. 6A, 6B, and 6C depict exemplary (preferably flattened) gathering heads.
Figure 6B:
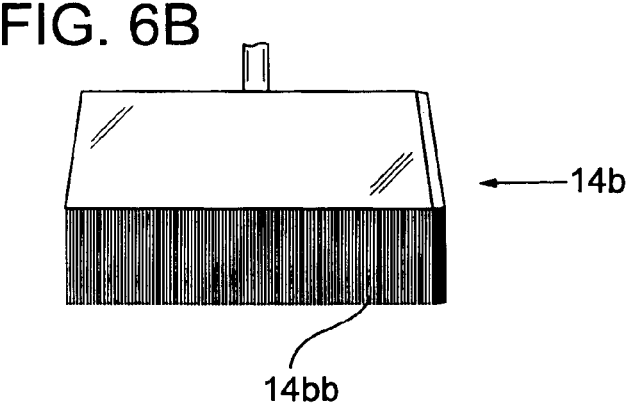
Figure 6C:
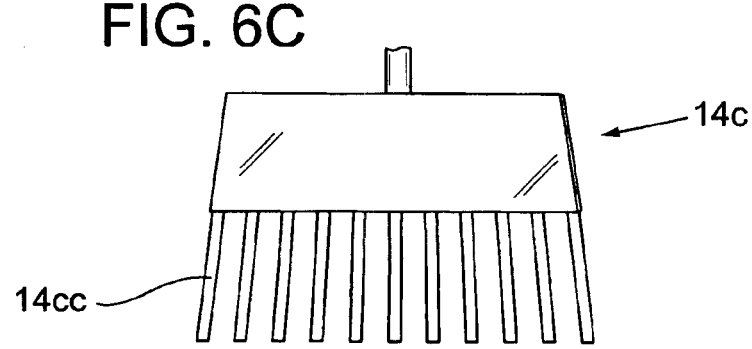

It may be noted that the term "gathering head 14" is to be broadly defined, and will be generically employed to indicate any possible gathering head, including the gathering heads 14a, 14b, and 14c, as depicted in FIGS. 6A, 6B, and 6C.

As clearly seen in FIGS. 1A and 1B, the gathering portion 12 may be detached or uncoupled from the grasping portion 24. When uncoupled from the grasping portion 24, the gathering portion 12 may be used in a known fashion to, for example, sweep or rake an area, in order to form at least one bunch or pile of debris. Alternately, as clearly depicted in FIGS. 2 and 3, the gathering portion 12 and the grasping portion 24 may be slidably coupled together while gathering activities are conducted. In FIG. 2, the grasping portion 24 is shown in the retracted position, in a normal orientation. In FIG. 3, the grasping portion 24, and the grasping member 28, are shown in an inverted position.

In a most preferred embodiment of the invention the grasping portion 24 is structured with a possibly substantially flattened grasping member 28, which is fixedly coupled to a user operable grasping sleeve 40 by coupling 22. As shown in FIG. 1B, the angle at which the grasping member 28 and the grasping sleeve 40 are coupled may be substantially equal to the downward angle A established between the gathering head 14 and a longitudinal axis 26 of the elongated handle 20 (as shown in FIG. 1B). Alternately, it may be desirable for downward angle employed with the grasping portion 24 to be, for example, slightly less than the downward angle A employed with the gathering portion 12.

As appreciated by skilled persons the coupling 22 that fixedly couples, possibly in a removable fashion, the gathering head 14 to a distal end 20b of the elongated handle 20 may be established at a pre-selected angle either during the manufacture of the invention (as depicted), say at the factory, or alternately, by the user via an adjustable coupling structure (not illustrated, but known in the art). Further, the coupling 42, which couples the grasping member 28 to the grasping sleeve 40 at a pre-selected downward angle, may also be provided by skilled persons in a variety of differing embodiments. Accordingly, it is certainly contemplated that embodiments of coupling 22 and coupling 42 may be provided by skilled individuals such that the couplings may be, fixed, adjustable and or detachable, as required for a specific embodiment of the invention and the intended use.

Figure 4A:
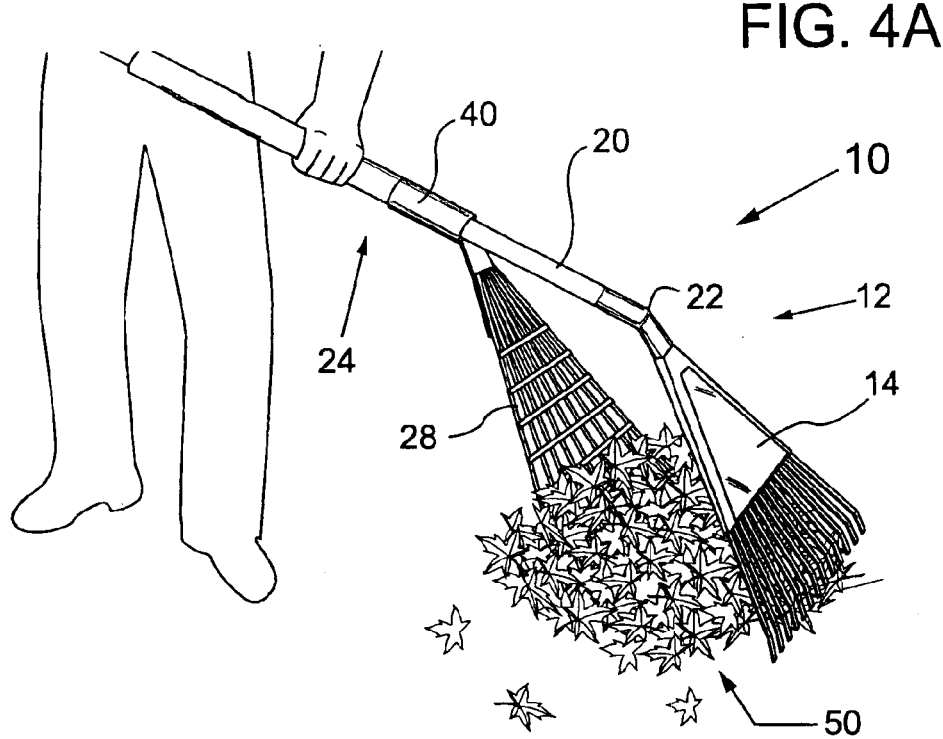
FIG. 4A illustrates the gathering and pickup tool of the invention poised in proximity to a bunch of debris (e.g., a pile of leaves), with the grasping portion substantially in a retracted position.
Figure 4B:
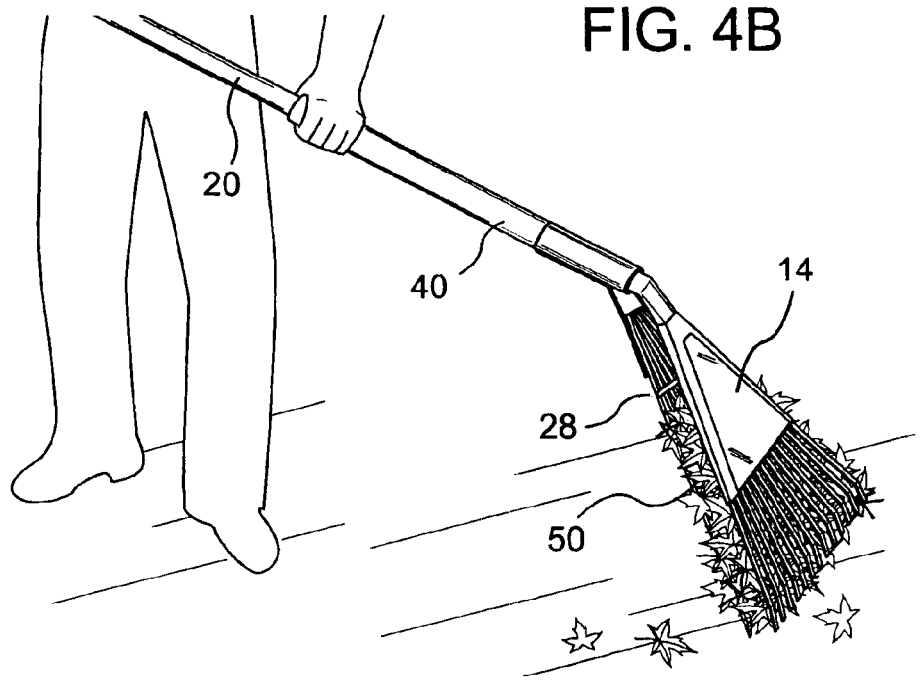
FIG. 4B shows the gathering and pickup tool of FIG. 4A with the grasping portion substantially in the grasping position, grasping at least a portion of the bunch of debris, which may then be subsequently lifted and released into a suitable disposal container.

Turning to FIGS. 2 and 3, the gathering and pickup tool 10 of the invention is illustrated in a coupled state, wherein the grasping portion 24 is slidably coupled to the gathering portion 12. When the grasping portion 24 is so coupled to the gathering portion 12, the grasping portion 24 may be selectively moved, by the user, between a retracted position (as in FIGS. 2 and 4A) and a grasping position (as shown in FIG. 4B). When in the retracted position the gathering portion 12 may be employed for gathering debris contained within a selected area to be cleaned up, producing one or more bunches. Once a bunch of debris has been formed, or is otherwise available, the debris gathering and pickup tool 10 may be positioned as shown in FIG. 4A, over at least a portion of a bunch 50. Next, as shown in FIG. 4B, the gathering portion 12 is moved by the user to the second (distal) grasping position, wherein at least a portion of the bunch may be grasped (sandwiched) between a second surface 15b of the gathering head 14 and a first surface 29a of the grasping member 28. The first and second surfaces of each of the gathering portion 12 and grasping portion 24 are clearly indicated in FIG. 1B.

As clearly illustrated in the included figures, a preferable coupling arrangement for slidably coupling the grasping portion 24 to the gathering portion 12 employs the grasping sleeve 40 having a suitable inside diameter to accept the elongated handle 20 therethrough. Accordingly, a simple slidable coupling in accordance with the present invention is established by inserting a first end 20a of the elongated handle 20, into and through a center opening at a distal end 40b of the grasping sleeve 40. As such, when coupled as depicted in FIGS. 4A and 4B, a longitudinal axis 46 (shown in FIG. 1B) of the grasping sleeve 40 is substantially aligned with the longitudinal axis 26 of the elongated handle 20.

Once the handle 20 has passed through the grasping sleeve 40, and is substantially at the positions depicted in FIG. 2 or 3, the gathering of debris 50 may commence to form at least one bunch (if this has not already occurred while the gathering and grasping portions were previously uncoupled). Next, as depicted in FIGS. 4A and 4B, the gathering and pickup tool 10 may be used to grasp portions of a bunch of debris 50 for lifting and disposal.

An alternate embodiment of the invention, in contrast to the embodiment depicted in FIG. 1, may call for the grasping sleeve, or functionally equivalent structures, to be permanently fixed to the elongated member 20. These alternate embodiments would preferable be structured with a grasping portion 24 arranged such that the grasping member 28 is simply detached (via a detachable coupling 42) when there is a desire to gather debris with the grasping member 28 attached.

As clearly shown in FIG. 6, the gathering head 14 of the invention is to be broadly defined, and may be provided in a number of varying forms, including a rake head 14a (having rake fingers 14aa), a broom head 14b (with broom bristles 14bb located at the lower end thereof), as a course rake head 14c (having spaced and possibly rigid rake fingers 14cc). Yet other variations and embodiments are certainly possible and providable by skilled persons. It may also be noted that although illustrated as being quite planar in form, other preferred embodiments of the gathering head 14 and or the grasping member 28 of the invention may be provided with curvatures, as well as other structural modifications to facilitate gathering and grasping effectiveness during use.

Figure 5:
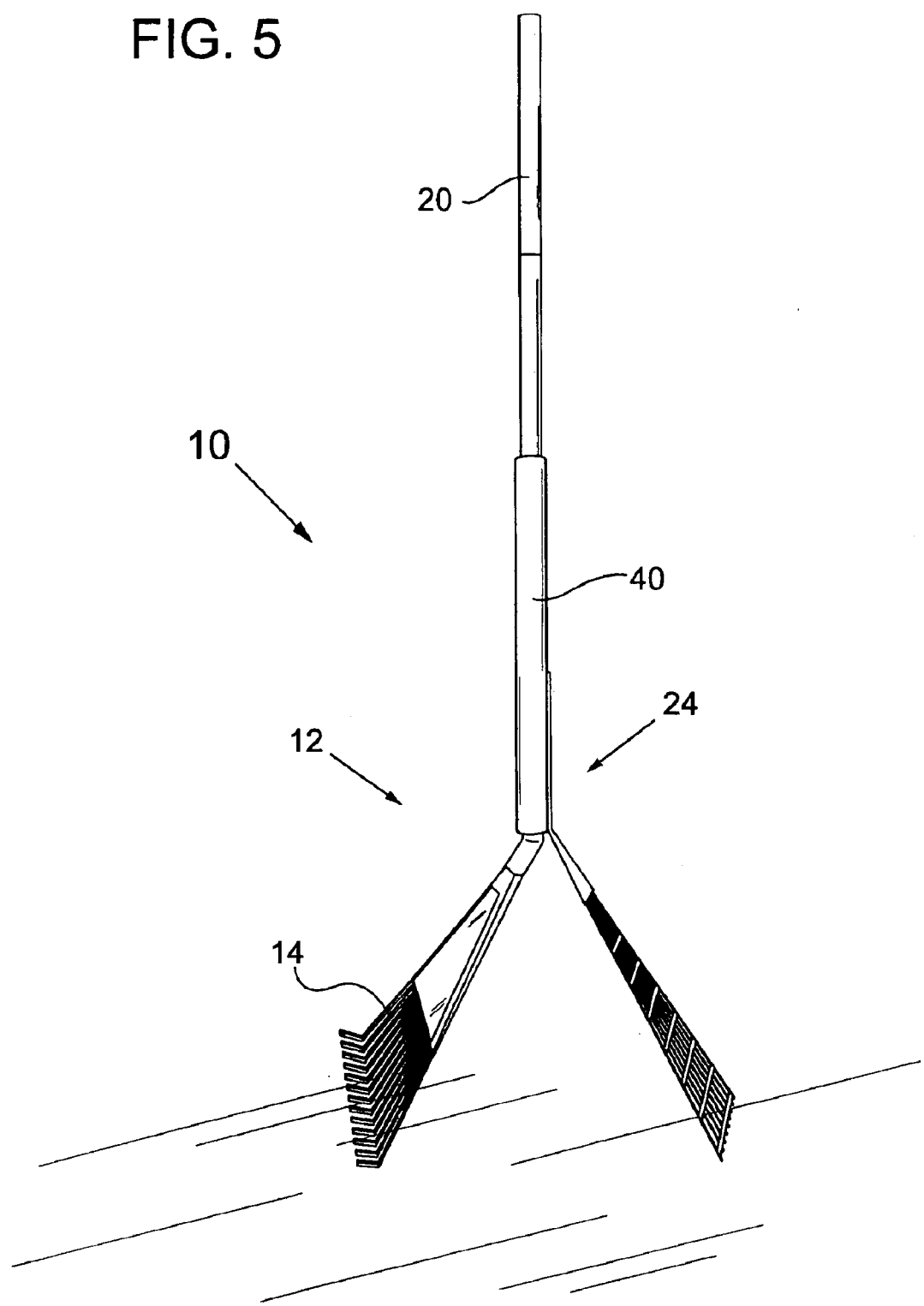
FIG. 5 illustrates the gathering and pickup tool in a standing up position, which may be considered a standby or ready to use position.

As appreciated by skilled persons, an important result of an individual using the present invention is the reduction of the number of times the individual needs to bend over while cleaning a selected area. To further this reduction in bending, embodiments of the debris gathering and pickup tool 10 of the invention may be placed by a user in a 'standing position' when the tool is not going to be used for an interval of time. The standing position, which may be considered a standby position, is clearly illustrated in FIG. 5. Accordingly, when the tool is again needed by user, the vertically oriented elongated handle 20 and or the grasping sleeve 40 may be readily grasped without a need to bend over.

Another aspect of the invention, which is depicted in FIG. 7, calls for the inclusion of a holding or locking mechanism 44. For example, preferred embodiments of the invention 10 may further include the locking mechanism 44, which is activated and deactivated by a user, and structured for maintaining the grasping sleeve 40 (or equivalents thereto) at a user selected position along the elongated handle 20. The selected position would preferable be inclusively between the retracted position (FIG. 4A) and the grasping position (FIG. 4B), and most often actually be the retracted position. As with the couplings 22 and 42, the locking mechanism 44 may be provided by skilled individuals in a variety of configurations.

While there have been described herein a plurality of the currently preferred embodiments of the present invention, along with contemplated methods of operation and use, those skilled in the art will recognize that other and further modifications may be made without departing from the invention. As such, the foregoing descriptions of the specific embodiments of the present invention have been presented for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. A debris gathering and pickup tool, comprising:
   a) a gathering portion, including
      i) a flattened gathering head;
      ii) an elongated handle having an outer diameter; and
      iii) a coupling arrangement for fixedly coupling the gathering head to the elongated handle, the coupling arrangement effecting the coupling such that the gathering head is attached to the elongated handle at a pre-selected and fixed downward angle with respect to a longitudinal axis of the elongated handle; and
   b) a grasping portion which is separable from the gathering portion, the grasping portion including
      i) a flattened grasping member; and
      ii) a user operated grasping sleeve, which is structured with the grasping member fixedly coupled to the grasping sleeve at an angle substantially equal to the downward angle established between the gathering head and the longitudinal axis of the elongated handle;
      iii) with the grasping sleeve structured having an internal diameter selected to co-axially accept the elongated handle therein for establishing a slidable coupling between the gathering portion and the grasping portion;
   c) wherein the slidable coupling of the grasping portion to the elongated handle of the gathering portion is such that the grasping portion may be slidably moved by the user to a selected position along the elongated handle between a first retracted position, wherein the gathering portion may be employed for gathering debris and forming bunches, and a second grasping position wherein debris may be grasped between a second surface of the gathering head and a first surface of the grasping member, enabling a lifting and subsequent disposal of gathered debris.

2. The debris gathering and pickup tool in accordance with claim 1, wherein the downward angle established between each of the gathering head and the elongated handle, as well as the grasping, member and the grasping sleeve, is substantially in the range of 15 to 60 degrees.

3. The debris gathering and pickup tool in accordance with claim 2, wherein each downward angle is substantially 30 degrees.

4. The debris gathering and pickup tool in accordance with claim 1, wherein the grasping portion is detachable from the gathering portion by the user sliding the grasping sleeve, and thereby the grasping portion, off of a first end of the elongated handle, thereby de-coupling the gathering portion from the grasping portion.

5. A debris gathering and pickup tool, structured with a gathering portion which is separable from a grasping portion, and arranged for gathering debris contained within a selected area, and grasping and lifting the debris for subsequent disposal, the debris gathering and pickup tool comprising:
   a) a gathering portion, including
      i) a flattened gathering head;
      ii) an elongated handle; and
      iii) a first coupling arrangement for fixedly coupling the gathering head to the elongated handle so that the gathering head is fixedly attached to the elongated handle at a pre-selected and fixed downward angle with respect to a longitudinal axis of the elongated handle; and
   b) a grasping portion, which is separable from the gathering portion, the grasping portion including
      i) a flattened grasping member;
      ii) a user operated grasping sleeve; and
      iii) a second coupling arrangement for fixedly coupling the grasping member to the grasping sleeve such that the grasping member is coupled to the grasping sleeve at a pre-selected and fixed downward angle with respect to a longitudinal axis of the grasping sleeve;
      iv) with the grasping portion arranged for being slidably coupled to the gathering portion, by the user, by inserting a first end of the elongated handle, into and through a center opening at a distal end of the grasping sleeve, causing the elongated handle to be placed coaxially through a center opening of the grasping sleeve of the grasping portion;
   c) thereby establishing the slidable coupling between the separable grasping portion and the gathering portion so that the grasping portion may be moved by the user to a selected position along a length of the elongated handle between a first retracted position, wherein the gathering portion may be employed for gathering debris and forming bunches of debris, and a second grasping position wherein debris may be grasped between a second surface of the gathering head and a first surface of the grasping member, enabling a lifting of the gathered debris for subsequent disposal.

6. The debris gathering and pickup tool in accordance with claim 5, wherein the downward angles established between the gathering head and the elongated handle, as well as the grasping member and the grasping sleeve, are equal and substantially in the range of 15 to 60 degrees.

7. The debris gathering and pickup tool in accordance with claim 6, wherein the downward angles are each substantially 30 degrees.

* * * * *